(12) United States Patent
Sagar et al.

(10) Patent No.: US 12,210,916 B2
(45) Date of Patent: Jan. 28, 2025

(54) REGENERATION AUDIT LOG

(71) Applicant: Salesforce, Inc., San Francisco, CA (US)

(72) Inventors: Gaurav Sagar, Bellevue, WA (US); Antonio Garrote, San Francisco, CA (US); Javier Isoldi, Buenos Aires (AR); Patricio Barletta, Brentwood, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/821,417

(22) Filed: Aug. 22, 2022

(65) Prior Publication Data

US 2024/0061725 A1  Feb. 22, 2024

(51) Int. Cl.
| G06F 3/00 | (2006.01) |
| G06F 9/54 | (2006.01) |
| H04L 67/10 | (2022.01) |
| H04L 67/51 | (2022.01) |

(52) U.S. Cl.
CPC ............. *G06F 9/54* (2013.01); *H04L 67/10* (2013.01); *H04L 67/51* (2022.05)

(58) Field of Classification Search
CPC ...................................................... G06F 9/541
USPC .......................................................... 719/328
See application file for complete search history.

(56) References Cited

U.S. PATENT DOCUMENTS

| 10,365,905 | B1 * | 7/2019 | Ong | G06F 8/433 |
| 10,452,648 | B1 * | 10/2019 | Holenstein | G06F 16/2379 |
| 2003/0069902 | A1 * | 4/2003 | Narang | G06F 16/2477 |
| | | | | 707/999.203 |
| 2004/0148612 | A1 * | 7/2004 | Olsen | G06F 40/143 |
| | | | | 707/E17.124 |
| 2006/0265385 | A1 * | 11/2006 | Agrawal | G06F 16/256 |
| 2008/0177770 | A1 * | 7/2008 | Friedlander | G06F 21/6227 |
| 2011/0137546 | A1 * | 6/2011 | Roesser | G01C 21/3859 |
| | | | | 707/769 |

(Continued)

FOREIGN PATENT DOCUMENTS

| CN | 109815262 A | * | 5/2019 |
| CN | 113391795 A | * | 9/2021 |

OTHER PUBLICATIONS

Hoan Anh Nguyen, A Graph-based Approach to API Usage Adaptation. (Year: 2010).*

(Continued)

*Primary Examiner* — Lechi Truong
(74) *Attorney, Agent, or Firm* — Holland & Hart LLP

(57) ABSTRACT

A federation management service may generate a federated application program interface (API) based on multiple data sources. The federation management service may detect changes to one or more of the multiple data sources, which may result in generation of a new version of the federated API. The changes to the data sources may be documented in a change event log. The change event log may be used to recreate a prior version of the federated API by applying changes of the change event log to a federated schema corresponding to the federated API. A snapshotting technique may capture the state of the federated schema at various points in time, and snapshots may be used to regenerate a prior version of the federated API using the change events of the change event log.

20 Claims, 11 Drawing Sheets

(56) References Cited

U.S. PATENT DOCUMENTS

| | | | |
|---|---|---|---|
| 2011/0145800 A1* | 6/2011 | Rao | G06F 11/3636 |
| | | | 717/133 |
| 2011/0307897 A1* | 12/2011 | Atterbury | G06F 9/4494 |
| | | | 718/102 |
| 2012/0079210 A1* | 3/2012 | Chinthamani | G06F 12/0837 |
| | | | 711/146 |
| 2015/0309777 A1* | 10/2015 | Salnikov-Tarnovski | |
| | | | G06F 9/45504 |
| | | | 717/157 |
| 2016/0004518 A1* | 1/2016 | Sharma | G06F 8/443 |
| | | | 717/157 |
| 2017/0364555 A1* | 12/2017 | Sirigireddy | G06F 16/24534 |
| 2019/0340287 A1* | 11/2019 | Tamjidi | G06F 16/242 |
| 2020/0201820 A1* | 6/2020 | Lutz | G06F 16/172 |

OTHER PUBLICATIONS

Marco Piccioni, An Empirical Study of API Usability. (Year: 2013).*
S M Sohan, A Case Study of Web API Evolution. (Year: 2015).*
Tanu Malik, SkyQuery: A Web Service Approach to Federate Databases. (Year: 2002).*

* cited by examiner

REGENERATION AUDIT LOG

FIELD OF TECHNOLOGY

The present disclosure relates generally to data processing, and more specifically to a regeneration audit log.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant data processing system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Clients or applications may interact with computing services via application programming interfaces (APIs). In some examples, an application may access different types of services (e.g., database service, web-service) using different endpoints. However, configuration of an application to access different APIs may require significant overhead and may result in application inefficiencies. More particularly, a developer may need to configure an application to access multiple APIs with different authentication settings, among other settings. Additionally, as an application may need to ping different APIs to perform a service, the application may have built-in latencies due to an operation depending on responses from multiple APIs, which may have different response times.

DETAILED DESCRIPTION

Figure 1:
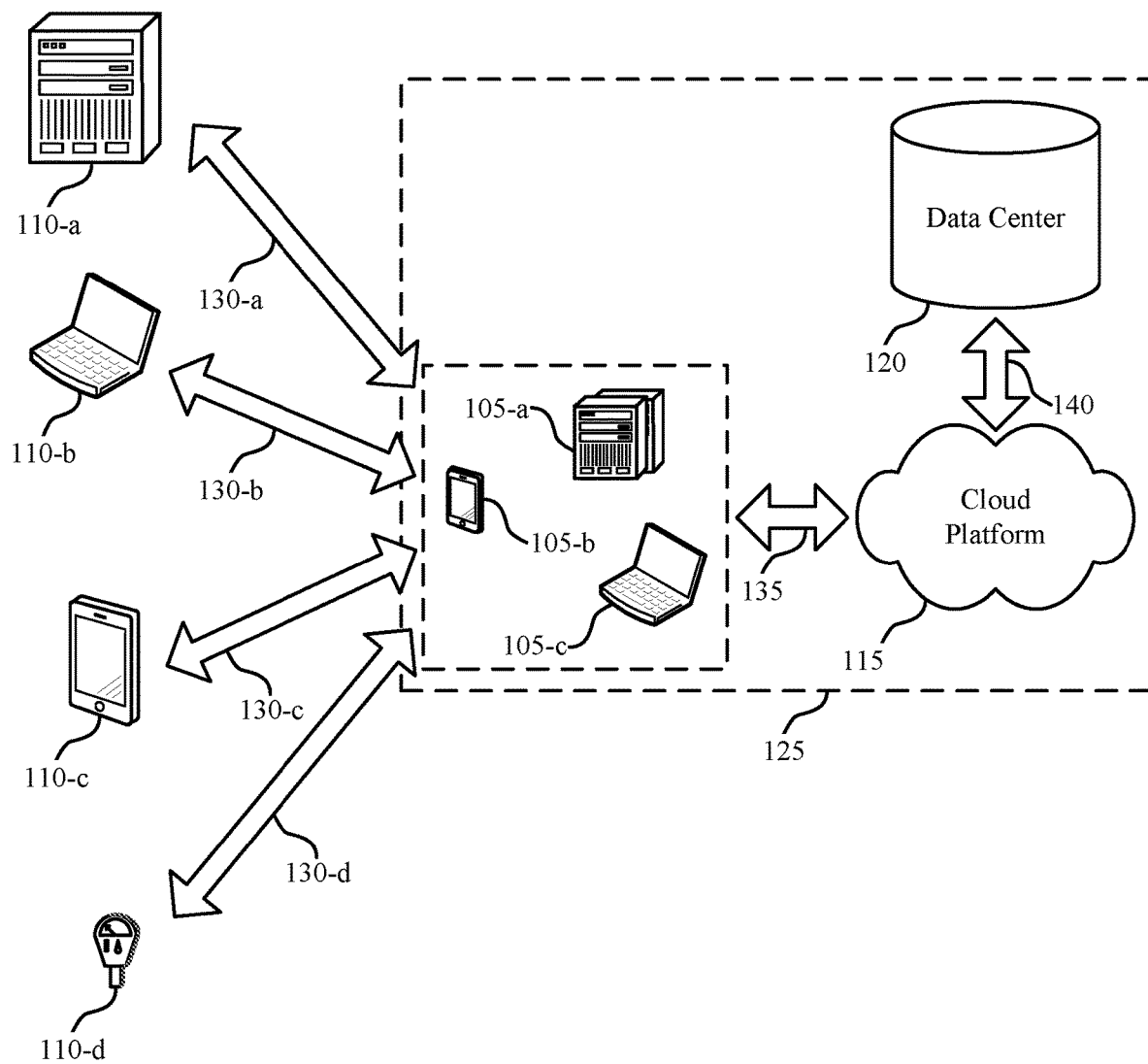
FIG. 1 illustrates an example of a data processing system that supports regeneration audit log in accordance with aspects of the present disclosure.

Clients or applications may interact with computing services via application programming interfaces (APIs). In some examples, an application may access different types of services (e.g., database service, web-service) using different APIs. However, configuration of an application to access different APIs may require significant overhead and may result in application inefficiencies. More particularly, a developer may need to configure an application to access multiple APIs with different authentication settings, among other settings. Additionally, as an application may need to ping different APIs to perform a service, the application may have built-in latencies due to an operation depending on a response from multiple APIs, which may have different response times.

Users of these various APIs may federate these APIs into a single federated API such as to simplify application configuration. An API federation service may generate a federated API that aggregates multiple data sources (e.g., APIs, databases, etc.), such that downstream consumers of the federated API can make a single query to retrieve data from the multiple data sources. A federation management service may process multiple different APIs to generate a single new API having a unified schema that incorporates the linkings across the multiple APIs. In such examples, one or more sources and schemas may be integrated into the single federated API. While the federated API is deployed, a user may make changes or edits in the individual sources (e.g., APIs, databases, and the like) and their schemas, which may cause a new federated API to be generated based on the updated data sources. In different situations, (e.g., for audit purposes, testing, etc.) previous versions of the federated API associated with a specific moment in time prior to the current moment in time may be regenerated.

In some implementations of the present disclosure, an efficient system of storing changes to the underlying data sources of a federated API, and the stored changes may support generation of a previous version of a federated schema and the associated version of the federated API. For example, a durable append log may be created to store any individual modification in the one or more data sources and the changes to their respective schemas. The log may contain the individual changes as well as the authors of the respective changes (e.g., for audit purposes). For each change made to a source and their schema, the federated API may be modified and updated accordingly (e.g., new version of the federated API may be generated). To regenerate a selected previous version of the federated API, starting from the creation of the federated API, each change or edit until the selected previous version may be applied to a federated schema until the selected previous version is regenerated.

In implementations of the present disclosure, in the case of a large quantity of changes or edits in the log, a federation management service may periodically save a snapshot of the current state of the federated API. For example, the system may periodically store materialized versions of the federated schema corresponding to the federated API in addition to the change event log described herein. Thus, using the snapshotting mechanism, the full log may not be reprocessed to regenerate a previous version of the federated schema. Instead, the snapshotting mechanism may use the closest snapshot to the selected previous version, load the snapshot, and apply any edits or changes, from the change event log, following the selected snapshot until the selected previous version is generated. As such, the snapshotting technique may support improved time and efficiency in the system as snapshotting may prevent reprocessing the large quantity of changes or edits on the federated schema.

Aspects of the disclosure are initially described in the context of an environment supporting an on-demand database service. Aspects of the disclosure further described with respect to a computing environment illustrating API federation, a change event and snapshot timeline, and a process flow diagram. Aspects of the disclosure are further illustrated by and described with reference to apparatus diagrams, system diagrams, and flowcharts that relate to regeneration audit log.

FIG. 1 illustrates an example of a system 100 for cloud computing that supports regeneration audit log in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, a cloud platform may support various APIs that may be accessed by client devices and/or systems (e.g., applications). In some examples, an application may be configured to access multiple different APIs to support various services. Configuration of an application to access the various APIs may involve significant complexities. A federated API may be used to combine API elements for reduced configuration complexities. However, a federated API (or hosts of the federated API) may not be configured to handle varying loads for requests.

As described herein, the cloud platform 115 may support a federation service that generates a federated API based on underlying data sources that are selected for inclusion in the federated API. In some cases, users or administrators may modify the underlying data sources of the federated API, which may result in generation of new versions of the federated API. As such, changes or edits to one of the various data sources may result in a new version of the federated API. In different situations, (e.g., for audit purposes, testing, etc.) previous versions of the federated API associated with a specific moment in time prior to the current moment in time may be regenerated. To support generation of previous versions of a federation API, the federation management service of the cloud platform 115 may implement a regenerating audit log (e.g., change event log) that logs changes of the one or more data sources (e.g., data source APIs) of the federated API.

Changes or edits may be made to the individual data sources that make up the federated API, and as such, the federation service may generate a new version of the federated API. The new version of the federated API may be generated in accordance with a change or edit to one of the data sources of the federated API (e.g., an edit, addition, deletion, or any other modification to a data source). As described herein, the regenerating audit log may store the individual changes to the source APIs. As such, to regenerate a selected previous version, the changes may be applied to a federated schema in sequence as represented in the regenerating audit log. To prevent or limit long process times, the federated service may store a snapshot of the federated API after a set of changes or based on some schedule or sequence. To regenerate a selected previous version of the federated API, the federation management service of the cloud platform 115 may identify the nearest snapshot to the selected previous version and then apply the logged changes of the change event log in sequence until the federated schema corresponding to the selected previous version of the federated API is recreated.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
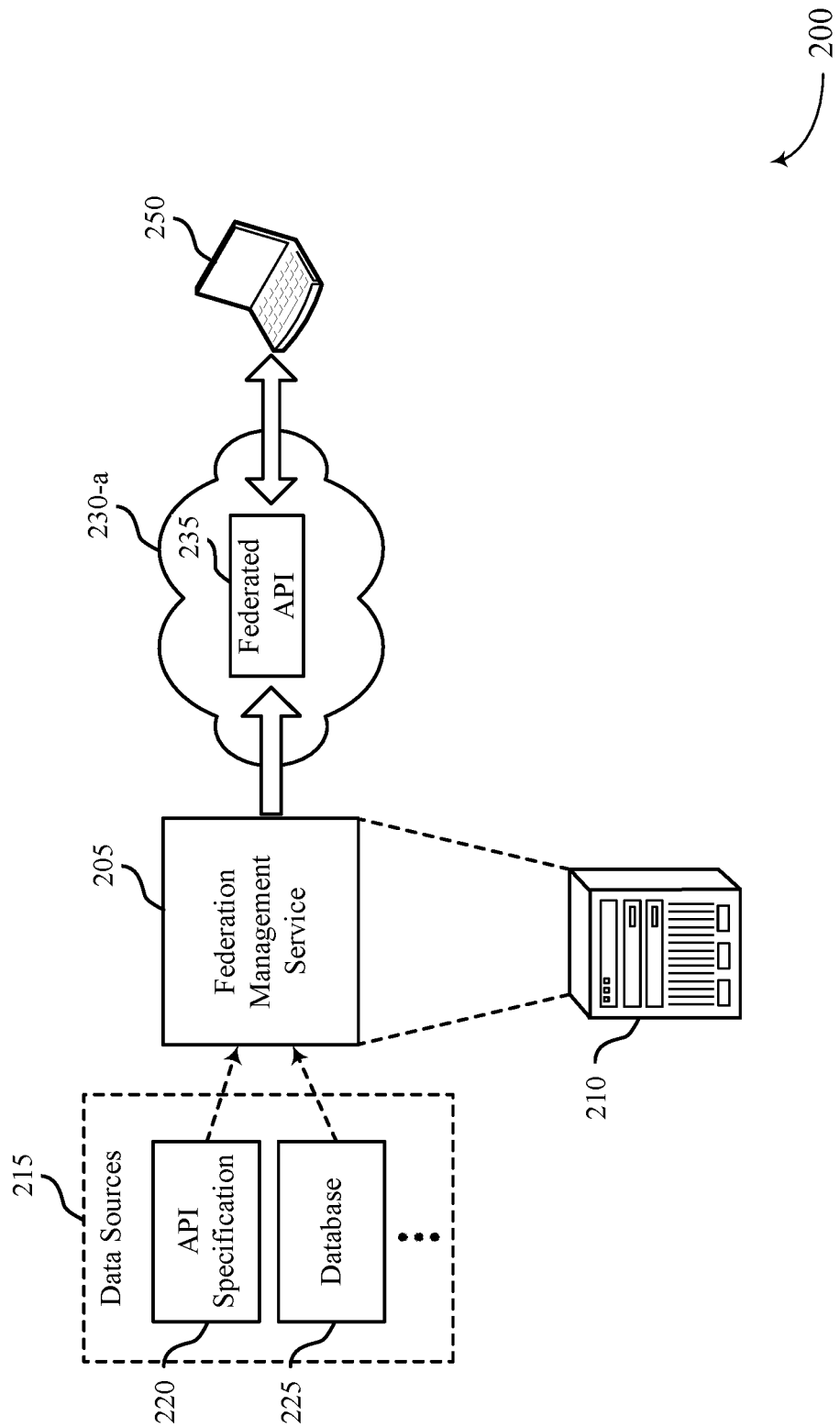
FIG. 2 illustrates an example of a computing environment that supports regeneration audit log in accordance with aspects of the present disclosure.

FIG. 2 illustrates an example of a computing environment 200 that supports regeneration audit log in accordance with aspects of the present disclosure. The computing environment 200 includes a server 210, hosts 230, and client devices 250. The server 210 may be an example of aspects of cloud platform 115 of FIG. 1 and/or subsystem 125 of FIG. 1. The server 210 may represent various physical and/or logical computing systems that support a federation management service 205 that may be used by clients or tenants (e.g., cloud client 105 of FIG. 1) in support of applications that are accessible via computing devices, such as client devices 250.

Some applications (e.g., client applications executing on client devices 250, web services, etc.) may retrieve data from multiple data sources, such as data sources 215. For example, an application (or service supported by an application) may provide a status of an online purchase order, and the application may retrieve data related to shipping information from a first data source, data related to order status information from a second data source, and data related to the item being purchased from a third data source. The application may interface with these data sources using respective APIs. The data sources may include RESTful APIs, Async APIs, gRPC APIs, databases or the like. Conventional techniques for retrieving data or accessing services may require configuration of multiple APIs at the application and configuration of the application to process the data received from the multiple APIs (e.g., by merging or linking fields via hardcoded relationships).

The federation management service 205 described herein may support the creation of an aggregated or federated API 235 based on multiple data sources 215. In such examples, a user (e.g., an API architect or administrator) may declaratively link elements from multiple APIs using a user interface. The federation management service 205 may generate a new API having a unified schema that incorporates the linked elements across the multiple data sources 215. In some examples, the federated API may be referred to as a datagraph.

The federation management service 205 may support a user interface (UI) that allows a user to select multiple data sources 215 that are to be included in the federated API 235. The user may also select various deployment configurations, such as a host environment (e.g., a host 230a, which may be an example of a cloud environment), endpoint details, authentication details, and the like. After selection of configuration parameters, the federation management service 205 may ingest or process the data sources 215, such as APIs and databases based on API specification 220 and/or a schema of a database 225, to generate the federated API 235. The federated API 235 may be deployed at the host environment (e.g., host 230-a) based on the user selected parameters. In some examples, the federated API 235 is deployed in a cloud environment (e.g., host 230-a). Additionally, or alternatively, the federated API 235 may be deployed at a local host (e.g., at a host associated with or supported by the server 210) or a host associated with the tenant or cloud client.

An application or client (e.g., an application or client executing on client devices 250) may be configured to access an endpoint of the federated API 235 to access data and/or services supported by the underlying data sources 215. As such, rather than accessing the data/services from multiple data source endpoints for each for the data sources 215, the application is configured to access the data/services using the endpoint(s) for the federated API 235, which may support improved computing efficiency (e.g., at the application and the hosts) and reduced complexity.

The lifecycle and versioning of federated API 235 may be automatically managed by the federation management service 205. For example, one of the data sources 215 is updated, and the federation management service 205 automatically creates a new version of the federated API 235. Updates to the data sources 215 may include addition, deletion, or modification of a tag, updating the specification, etc.

Techniques described herein support a change event log based on a federated API (e.g., federated API 235). The change event log may store any changes made to the data sources 215. The change event log may not store the new versions of the federated API (or the corresponding federated API schema) but instead may store each change made to one of the data sources 215 (e.g., addition, deletion, or modification of a tag, updating the specification, etc.). The change event log may be an example of a durable append log, where new changes may be appended to the log. Additionally, in conjunction with the changes to one of the data sources 215, the change event log may store the author of the change (e.g., for audit purposes).

The change event log (e.g., regenerating audit log) may support techniques to regenerate previous versions of the federated API 235. For example, an API schema of a first version of the federated API may be stored in conjunction with change event log that maintains the list of changes made to the data sources 215. The regenerating audit log may act as a first in, first out (FIFO) structure, and as such, the first entry available when processing through the regenerating audit log may be the first edit made to the data sources 215 of the federated API 235. As such, to regenerate to a selected previous version of the federated API 235, the federation management service 205 may apply changes from the change event log to the stored initial version of the API schema of the federated API 235 until the federated schema corresponding to the selected previous version of the federated API is generated. The resulting federated schema may be used to recreate the selected version of the federated API 235.

However, using such techniques may not be efficient with a large quantity of edits in change event log. To support the efficient federated API 235 version generation, the federation management service 205 may periodically generate and store snapshots of a current federated API 235 version. As such, to regenerate a selected previous version, the federation management service 205 may identify the closest snapshot to the selected previous version, load the given snapshot (e.g., a federated API schema captured by the snapshot), and apply any edits or changes in the regenerating audit log following the selected snapshot until the federated schema corresponding to the selected previous version is regenerated. This technique may allow the federation management service 205 to efficiently regenerate a previous version of the federated API 235 with a large plurality of edits or changes in the change event log, as all of the edits in the change event log may not be applied to generate the selected previous version.

Figure 3:
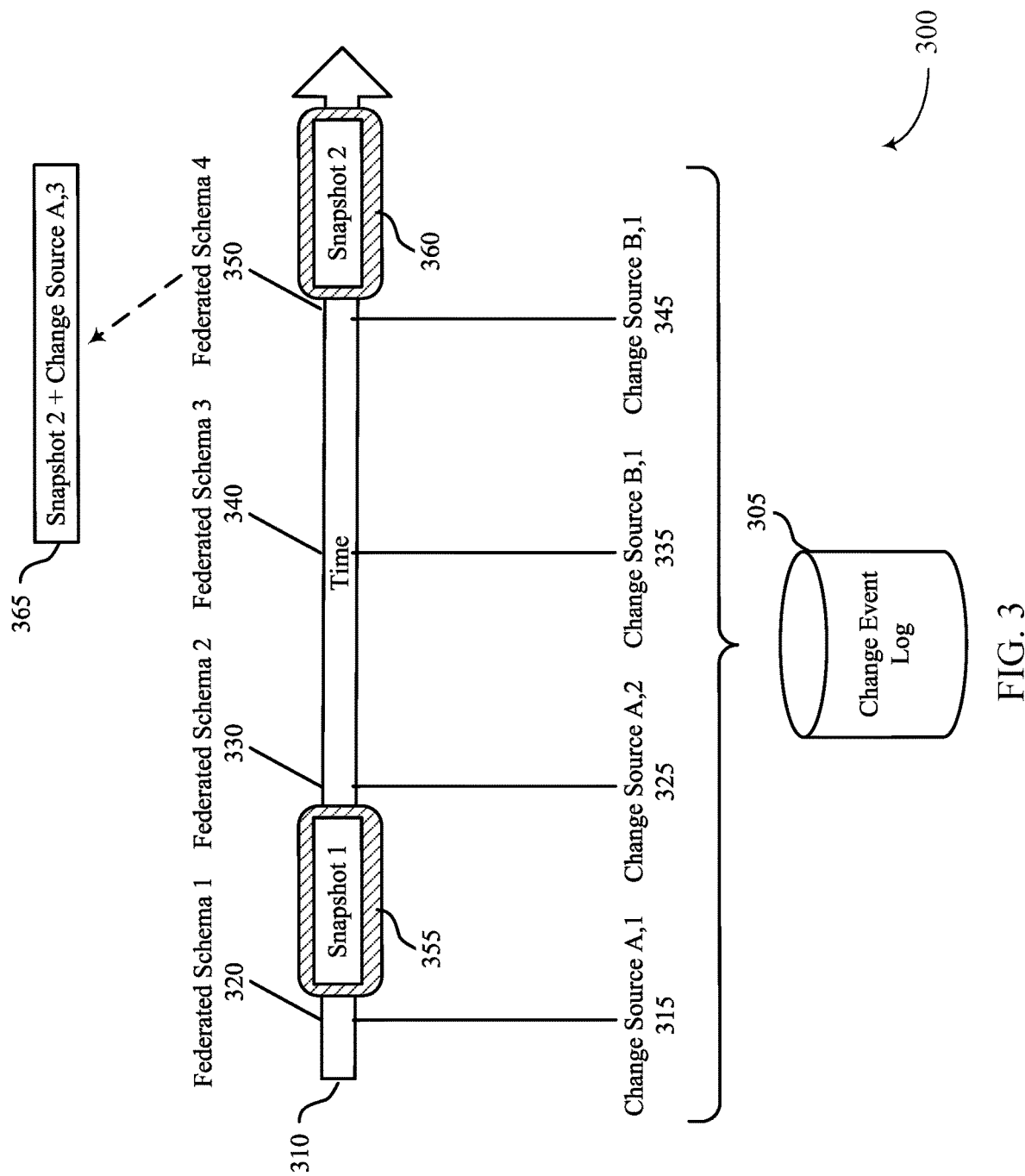
FIG. 3 illustrates an example of a timing diagram that supports regeneration audit log in accordance with aspects of the present disclosure.

FIG. 3 illustrates an example of a timing diagram 300 that supports regeneration audit log in accordance with aspects of the present disclosure. The timing diagram 300 may be implemented by a federation management service, such as the federation management service 205 of FIG. 2. In accordance with aspects of the present disclosure, edits or changes to data sources of a federated API (e.g., federated API 235 of FIG. 2) may be stored in a change event log 305. The change event log 305 may store changes made to data sources in the plurality of data sources in an append style such that the beginning of the log refers to a first change (e.g., change 315) and the end of the log refers to the most recent change (e.g., change 345). Before the first change 315 that creates a first federated schema version 320, a prior federated schema version or snapshot may be stored in the change event log 305 or in another storage location associated with the federation management service. In some cases, prior federated schema may be referred to as an initial federated schema version.

In some implementations, over a time period 310, a set of changes may be made to the data sources of the plurality of data sources creating a plurality of federated schema versions. As such, after a set of changes to a data source of the plurality of data sources are implemented or deployed, a new version of the federated schema may be generated. For example, after the first change 315 to a first source (e.g., a source A) the first federated schema version 320 may be generated. Following the generation of the first federated schema version 320, the change event log 305 may store an entry corresponding to the first change 315 at the end of the current state of the change event log 305. The entry may indicate the change, the type of change, the author of the change, an identifier for the changed data source, a version of the data source, or any combination thereof. In some examples, a second change 325 may be made to the first source. As such, a second federated schema version 330 may be generated and the second change 325 may be stored as an entry at the end of the change event log 305, after the first change 315. Further, a third change 335 may be made to a second source (e.g., a source B) and a fourth change 345 may be made to the first source. The changes may result in generation of a third federated schema version 340 and a fourth federated schema version 350 respectively and may be stored as an entry in the change event log 305 such that the first change 315 is the first change in the change event log 305 and the fourth change 345 is the last change in the change event log 305.

In some cases, the user may wish to regenerate a previous federated schema version (e.g., for audit purposes). For example, the user may wish to regenerate the fourth federated schema version 350. As such, to regenerate the selected previous version a federation management service may process through the change event log 305. In doing so, the federated schema version stored prior to the first change 315 may be loaded. The first change 315, the second change 325, the third change 335, and the fourth change 345 may be applied to regenerate the fourth federated schema version 350. However, this technique of federated schema version regeneration may be inefficient with a large quantity of changes stored in the change event log 305, as each change of the change event log 305 may be applied to an initial version of the federated schema to generate the target version of the federated schema.

In some examples, an additional snapshotting mechanism may support periodically storing materialized versions of the federated schema for sets of events. In some cases, the events in the set of events may be a point in time where a set of individual events were exposed to the consumers of the federated API. As such, the point in time snapshot may be generated and stored in the change event log 305 or in another storage location. For example, after the first change 315 the first federated schema version 320 may be generated and stored in a first snapshot 355. Changes after the first snapshot 355 may be stored to the change event log 305 (e.g., the second change 325, the third change 335, and the fourth change 345). A second snapshot 360 may capture the state of the fourth federated schema version 350.

A user may wish to regenerate a previous federated API such as a federated API corresponding to the third federated schema version 340. As such, to regenerate the federated API corresponding to the third federated schema version 340 using stored snapshots, the federation management service may load the first snapshot 355 associated with the third federated schema version 340 (as being the prior snapshot to the third federated schema version 340) and then apply the second change 325 and the third change 335 to the first snapshot 355. To generate the federated API corresponding to the fourth federated schema version 350, the federation management service may load the second snapshot 360. The regeneration using the stored snapshots may save the federation management service overhead and time as the length of the change event log 305 continues to grow.

Figure 4:
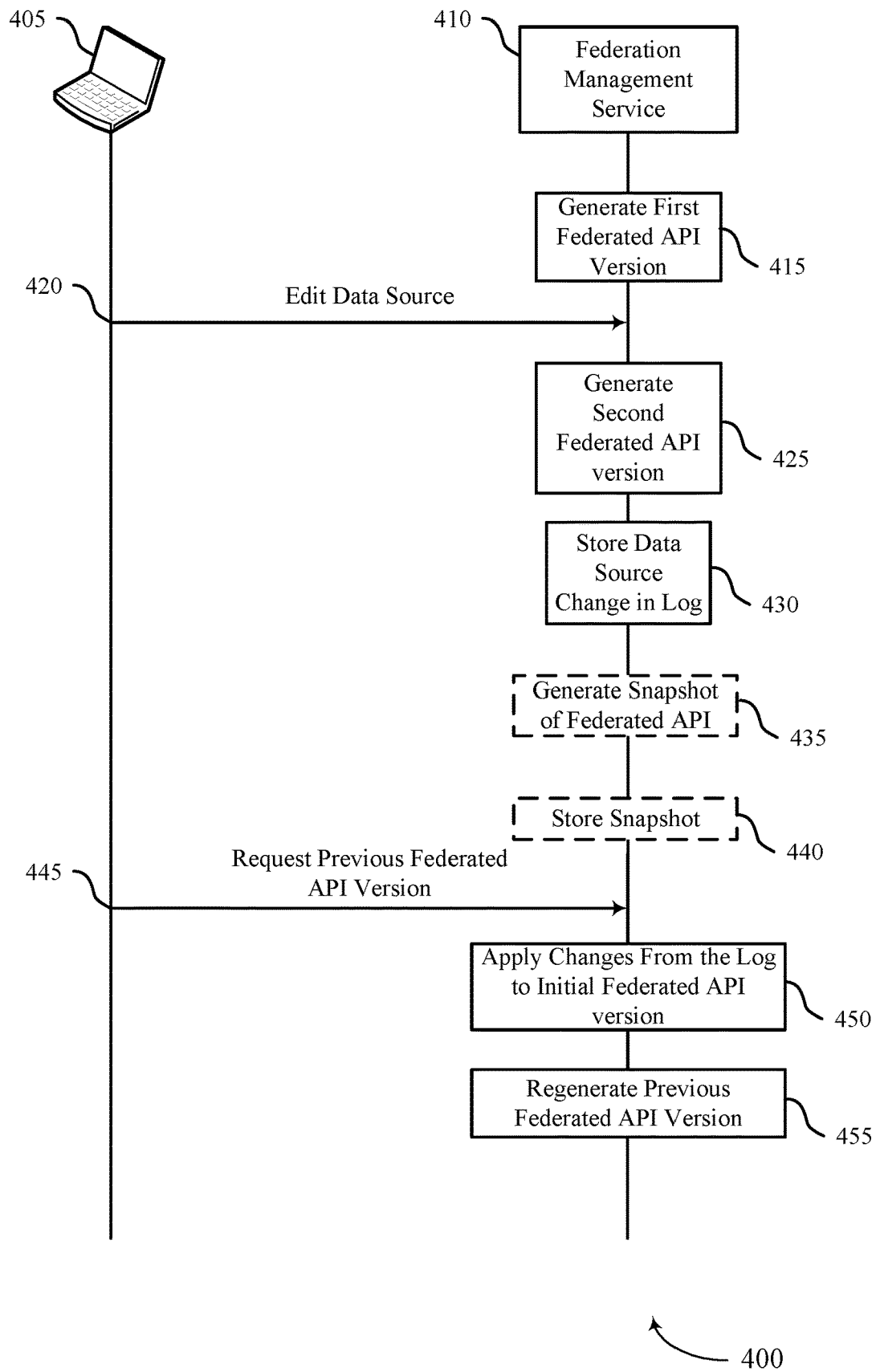
FIG. 4 illustrates an example of a process flow that supports regeneration audit log in accordance with aspects of the present disclosure.

FIG. 4 illustrates an example of a process flow 400 that supports regeneration audit log in accordance with aspects of the present disclosure. The process flow 400 includes a user device 405 and a federation management service 410, which may be an example of the federation management service 205 of FIG. 2. In some examples, some signaling or procedure of the process flow 400 may occur in different orders than shown. Additionally, or alternatively, some additional procedures of signaling may occur, or some signaling or procedures may not occur.

At 415, the federation management service 410 may generate a first version of a federated API from a plurality of data sources (e.g., APIs, databases, etc.). The federated API may also be associated with a first federated schema. Additionally in some cases, a version prior to the first version of the federated API may exist. Changes to data sources after the prior version may be stored in a change event log. In some other cases, the prior version may be an initial version of the federated API.

At 420, a user of the user device 405 may change or edit a data source of the plurality of data sources. For example, the change may include a modification to an element of the data source, a change to a version of the data source, or both. Additionally, the federation management service 410 may detect the change to the data source of the plurality of data sources.

At 425, the federation management service 410 may generate, based at least on detecting a change to a data source of the plurality of data sources at 420, a second version of the federated API. The second version of the federated API may be a different version from the first version of the federated API, or the initial version of the federated API. The detected change may be an edit to a data source from the plurality of data sources (e.g., an edit to an element, a deletion of an element, a data source version change, or a combination thereof) or may be an addition or removal of a data source from the federated API.

At 430, the federation management service 410 may store an entry corresponding to the change in the data source at 420 in a change event log. In some cases, the change event log may be an append log such that entries stored may be added to the end of the log (e.g., a first in, first out log). In some examples, storing the entry corresponding to the change may include storing an identifier of the data source, an identifier of an author of the change, a version number associated with a version of the data source, or a combination thereof. For example, the stored entries may be later used for audit purposes. In some other examples, the federation management service 410 may detect that the first version of the federated API is deployed to a host environment. As such, the federation management service 410 may store an indication that the first version of the federated API may be deployed to the host environment to the change event log.

At 435, the federation management service 410 may periodically generate a snapshot of the federated schema associated with one or more versions of the federated API. In some cases, the snapshot may be the federated schema of the current version of the federated API or may be a previous and recent federated schema.

At 440, the snapshot of the federated API may be stored in the change event log or to another storage location associated with the federation management service 410. As described herein, for efficiency purposes, the snapshot may be generated to avoid processing the full log to regenerate a selected federated schema.

At 445, the user device may request a selected previous version of the federated API to regenerate, where the current version is the second version of the federated API. In some examples, the federation management service 410 may receive, at a user interface of the federation management service that supports generation of the federated API, the selection of the previous version of the federated API. In some cases, the selected version of the previous version may be the first version of the federated API.

At 450, the federation management service 410 may apply one or more changes of the change event log to a version of a federated schema that is prior to the first version (e.g., the initial version). The one or more changes of the change event log applied may result in the first federated schema. In some cases, the federation management service 410 may apply one or more changes to a snapshot of the federated schema that is associated with a version prior to the first version. In some other cases, the one or more changes to the snapshot may result in the first federated schema associated with the first federated API (e.g., the requested previous version of the federated API). In some examples, the snapshot may be associated with the requested previous version of the federated API and no changes may be applied.

At 455, the federation management service 410 may recreate (e.g., regenerate) the first version of the federated API based at least on the first federated schema. In some cases, recreating the first version of the federated API may be based at least on receiving the selected previous version of the federated API at 445. In some examples, the federation management service 410 may regenerate the first version of the federated API for testing purposes. As such, the request for the previous version of the federated API (e.g., the first version of the federated API) may be made to test features on a version of the federated API that is related to but not the current version of the federated API (e.g., the second version of the federated API). For example, the federation management service 410 may deploy the first version of the federated API in a development environment that may run at the same time as the second version of the federated API running in an active environment.

Figure 5:
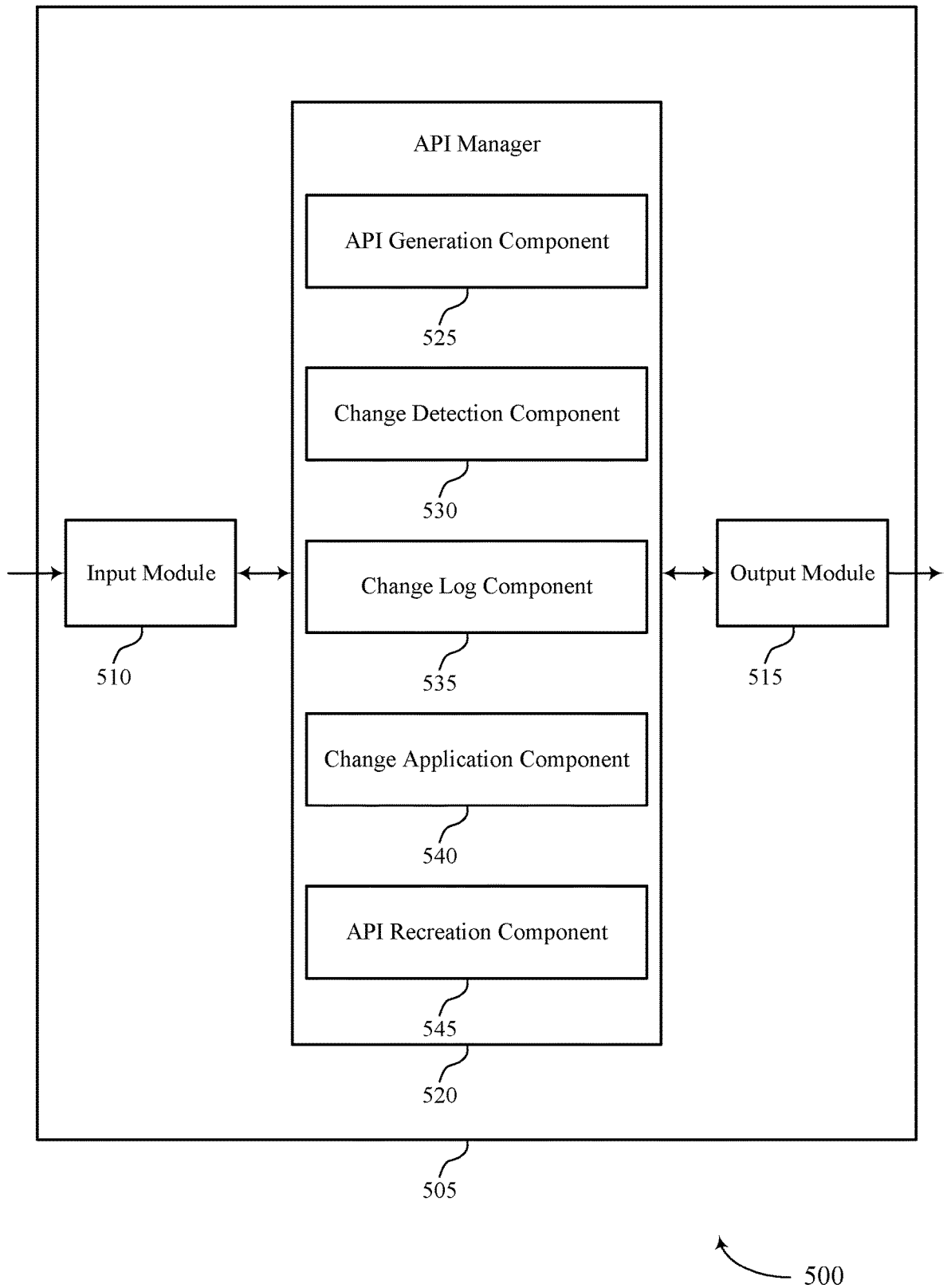
FIG. 5 shows a block diagram of an apparatus that supports regeneration audit log in accordance with aspects of the present disclosure.

FIG. 5 shows a block diagram 500 of a device 505 that supports regeneration audit log in accordance with aspects of the present disclosure. The device 505 may include an input module 510, an output module 515, and an API manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the API manager 520 to support regeneration audit log. In some cases, the input module 510 may be a component of an I/O controller 710 as described with reference to FIG. 7.

The output module 515 may manage output signals for the device 505. For example, the output module 515 may receive signals from other components of the device 505, such as the API manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the API manager 520 may include an API generation component 525, a change detection component 530, a change log component 535, a change application component 540, an API recreation component 545, or any combination thereof. In some examples, the API manager 520, or various components thereof, may be configured to perform various operations (e.g., receiving, monitoring, transmitting) using or otherwise in cooperation with the input module 510, the output module 515, or both. For example, the API manager 520 may receive information from the input module 510, send information to the output module 515, or be integrated in combination with the input module 510, the output module 515, or both to receive information, transmit information, or perform various other operations as described herein.

The API manager 520 may support data processing in accordance with examples as disclosed herein. The API generation component 525 may be configured as or otherwise support a means for generating a first version of a federated application programming interface (API) from a set of multiple data sources, the federated API associated with a first federated schema. The change detection component 530 may be configured as or otherwise support a means for generating, based on detecting a change to a data source of the set of multiple data sources, a second version of the federated API. The change log component 535 may be configured as or otherwise support a means for storing an entry corresponding to the change to the data source in a change event log. The change application component 540 may be configured as or otherwise support a means for applying one or more changes of the change event log to a version of a federated schema that is prior to the first version, where applying the one or more changes of the change event log results in the first federated schema. The API recreation component 545 may be configured as or otherwise support a means for recreating the first version of the federated API based on the first federated schema.

Figure 6:
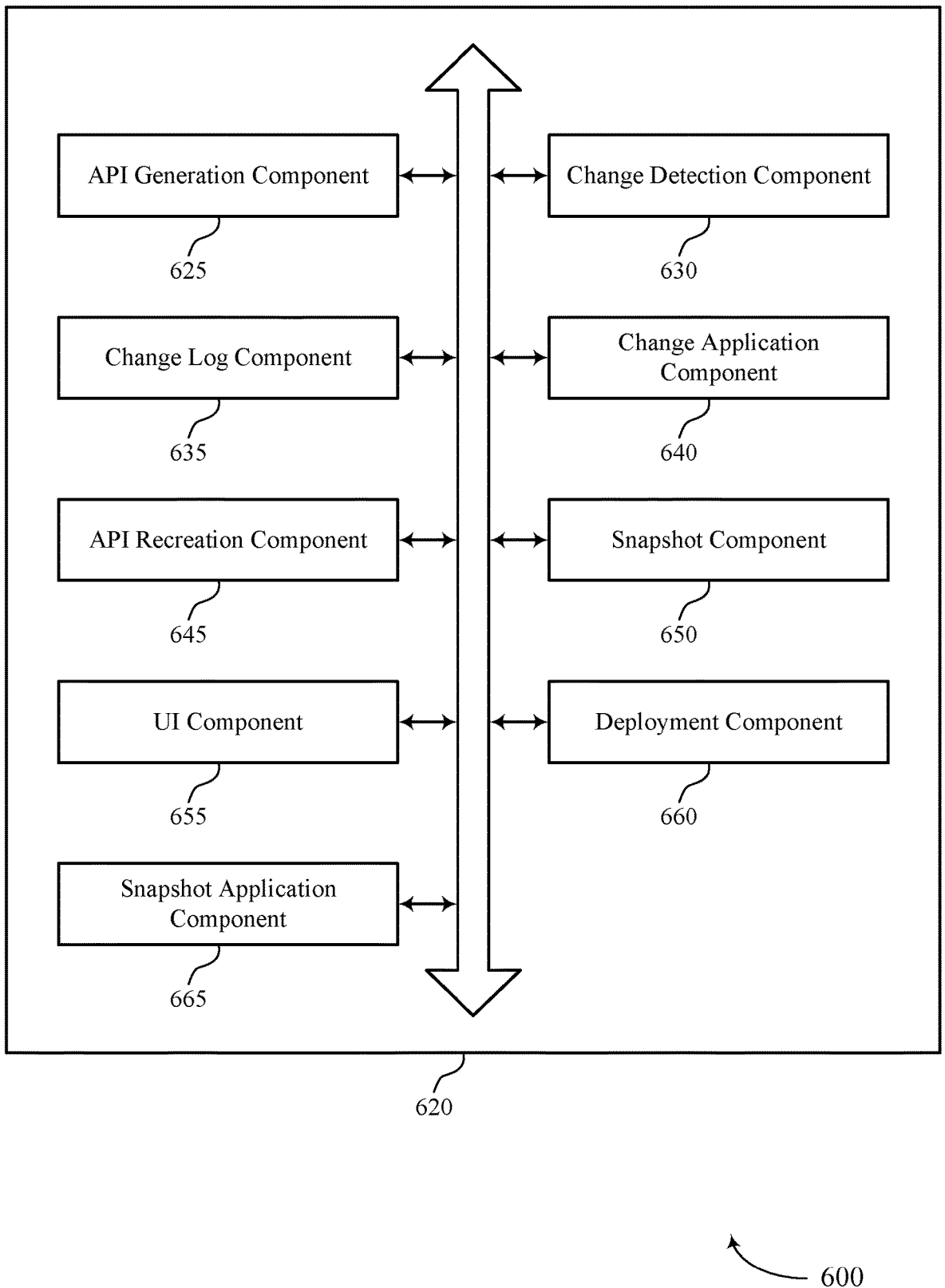
FIG. 6 shows a block diagram of an API manager that supports regeneration audit log in accordance with aspects of the present disclosure.

FIG. 6 shows a block diagram 600 of an API manager 620 that supports regeneration audit log in accordance with aspects of the present disclosure. The API manager 620 may be an example of aspects of an API manager or an API manager 520, or both, as described herein. The API manager 620, or various components thereof, may be an example of means for performing various aspects of regeneration audit log as described herein. For example, the API manager 620 may include an API generation component 625, a change detection component 630, a change log component 635, a change application component 640, an API recreation component 645, a snapshot component 650, a UI component 655, a deployment component 660, a snapshot application component 665, or any combination thereof. Each of these components may communicate, directly or indirectly, with one another (e.g., via one or more buses).

The API manager 620 may support data processing in accordance with examples as disclosed herein. The API generation component 625 may be configured as or otherwise support a means for generating a first version of a federated application programming interface (API) from a set of multiple data sources, the federated API associated with a first federated schema. The change detection component 630 may be configured as or otherwise support a means for generating, based on detecting a change to a data source of the set of multiple data sources, a second version of the federated API. The change log component 635 may be configured as or otherwise support a means for storing an entry corresponding to the change to the data source in a change event log. The change application component 640 may be configured as or otherwise support a means for applying one or more changes of the change event log to a version of a federated schema that is prior to the first version, where applying the one or more changes of the change event log results in the first federated schema. The API recreation component 645 may be configured as or otherwise support a means for recreating the first version of the federated API based on the first federated schema.

In some examples, the snapshot component 650 may be configured as or otherwise support a means for periodically generating a snapshot of the federated schema associated with one or more versions of the federated API, where the first version of the federated API is recreated based on the snapshot.

In some examples, to support applying the one or more changes, the snapshot application component 665 may be configured as or otherwise support a means for applying the one or more changes to the snapshot of the federated schema that is prior to the first version, where applying the one or more changes to the snapshot results in the first federated schema.

In some examples, the UI component 655 may be configured as or otherwise support a means for receiving, at a user interface of a federation management service that supports generation of the federated API, a selection of the first version of the federated API, where the one or more changes are applied to the version of the federated schema and the first version of the federated API is recreated based on receiving the selection of the first version at the user interface.

In some examples, to support storing the entry corresponding to the change, the change log component 635 may be configured as or otherwise support a means for storing an identifier of the data source, an identifier of an author of the change, a version number associated with a version of the data source, or a combination thereof.

In some examples, the change includes a modification to an element of the data source, a change to a version of the data source, or both.

In some examples, the deployment component 660 may be configured as or otherwise support a means for detecting that the first version of the federated API is deployed to a host environment. In some examples, the change log component 635 may be configured as or otherwise support a means for storing to the change event log, an indication that the first version of the federated API is deployed to the host environment.

Figure 7:
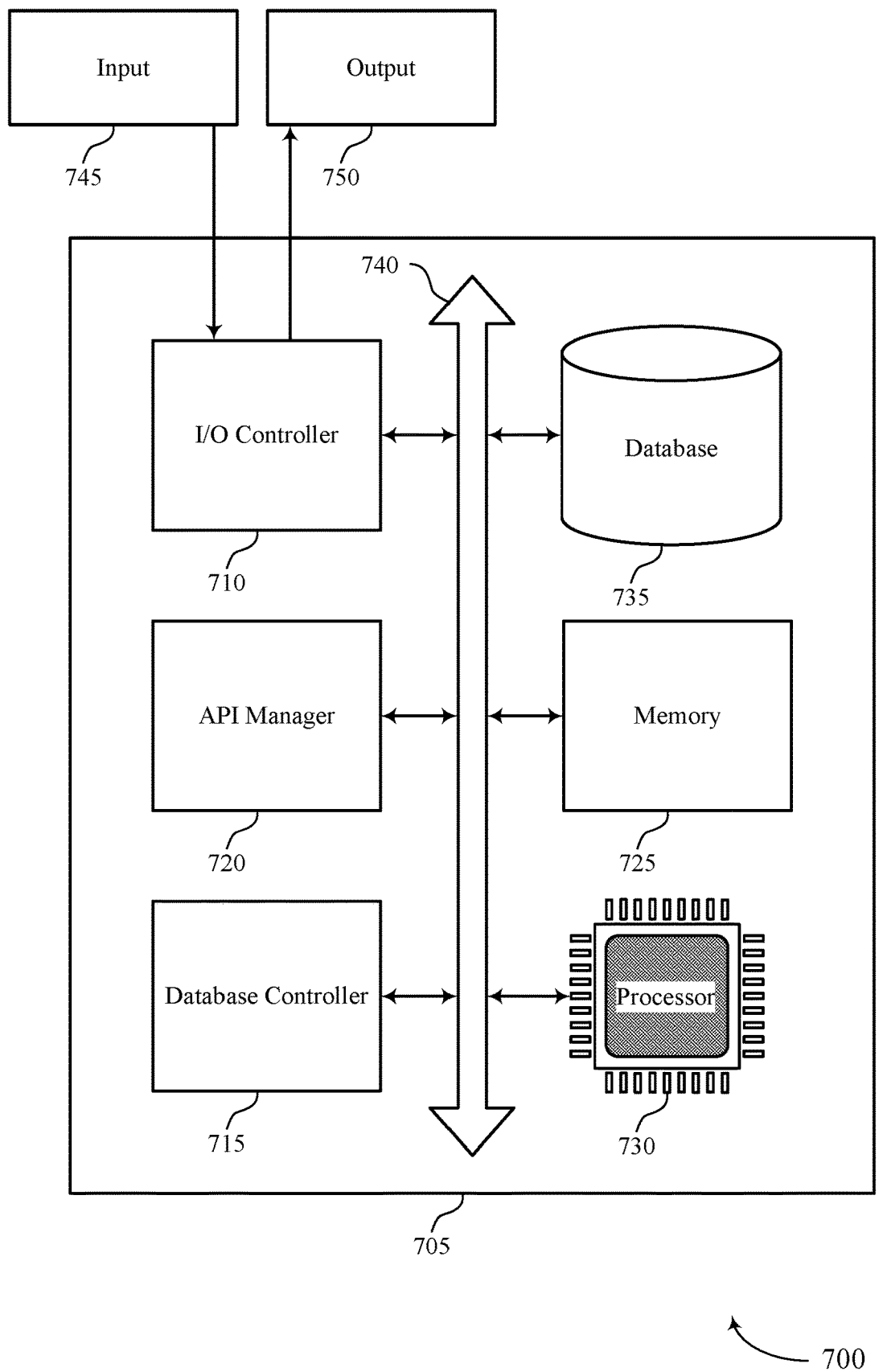
FIG. 7 shows a diagram of a system including a device that supports regeneration audit log in accordance with aspects of the present disclosure.

FIG. 7 shows a diagram of a system 700 including a device 705 that supports regeneration audit log in accordance with aspects of the present disclosure. The device 705 may be an example of or include the components of a device 505 as described herein. The device 705 may include components for bi-directional data communications including components for transmitting and receiving communications, such as an API manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting regeneration audit log).

The API manager 720 may support data processing in accordance with examples as disclosed herein. For example, the API manager 720 may be configured as or otherwise support a means for generating a first version of a federated application programming interface (API) from a set of multiple data sources, the federated API associated with a first federated schema. The API manager 720 may be configured as or otherwise support a means for generating, based on detecting a change to a data source of the set of multiple data sources, a second version of the federated API. The API manager 720 may be configured as or otherwise support a means for storing an entry corresponding to the change to the data source in a change event log. The API manager 720 may be configured as or otherwise support a means for applying one or more changes of the change event log to a version of a federated schema that is prior to the first version, where applying the one or more changes of the change event log results in the first federated schema. The API manager 720 may be configured as or otherwise support a means for recreating the first version of the federated API based on the first federated schema.

By including or configuring the API manager 720 in accordance with examples as described herein, the device 705 may support techniques for efficient generation of prior versions of federated APIs, which may result in improved user experience and data security.

Figure 8:
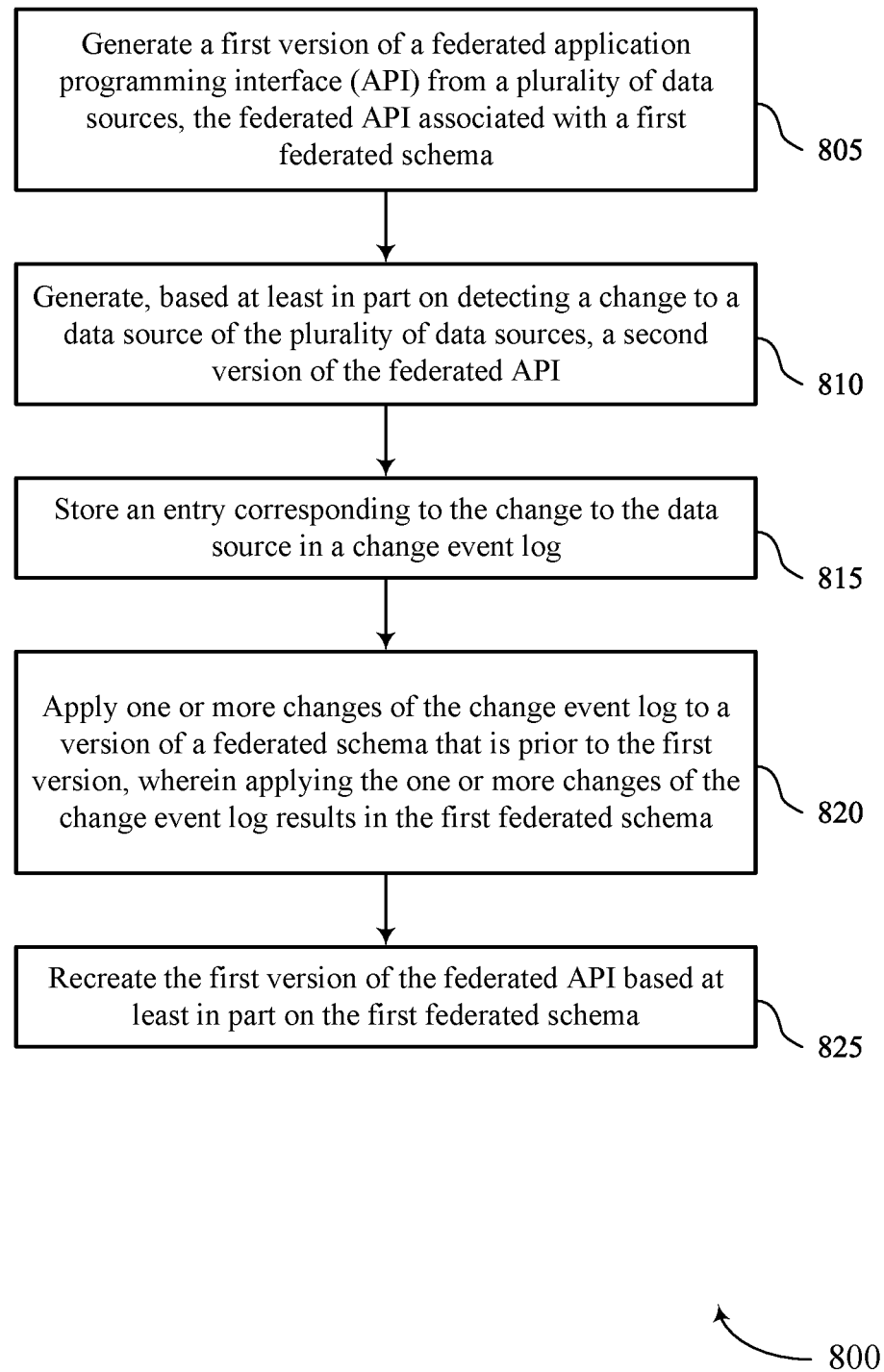
FIGS. 8 through 11 show flowcharts illustrating methods that support regeneration audit log in accordance with aspects of the present disclosure.

FIG. 8 shows a flowchart illustrating a method 800 that supports regeneration audit log in accordance with aspects of the present disclosure. The operations of the method 800 may be implemented by a server or its components as described herein. For example, the operations of the method 800 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 805, the method may include generating a first version of a federated application programming interface (API) from a set of multiple data sources, the federated API associated with a first federated schema. The operations of 805 may be performed in accordance with examples as disclosed herein. In some examples, aspects of the operations of 805 may be performed by an API generation component 625 as described with reference to FIG. 6.

At 810, the method may include generating, based on detecting a change to a data source of the set of multiple data sources, a second version of the federated API. The operations of 810 may be performed in accordance with examples as disclosed herein. In some examples, aspects of the operations of 810 may be performed by a change detection component 630 as described with reference to FIG. 6.

At 815, the method may include storing an entry corresponding to the change to the data source in a change event log. The operations of 815 may be performed in accordance with examples as disclosed herein. In some examples, aspects of the operations of 815 may be performed by a change log component 635 as described with reference to FIG. 6.

At 820, the method may include applying one or more changes of the change event log to a version of a federated schema that is prior to the first version, where applying the one or more changes of the change event log results in the first federated schema. The operations of 820 may be performed in accordance with examples as disclosed herein. In some examples, aspects of the operations of 820 may be performed by a change application component 640 as described with reference to FIG. 6.

At 825, the method may include recreating the first version of the federated API based on the first federated schema. The operations of 825 may be performed in accordance with examples as disclosed herein. In some examples, aspects of the operations of 825 may be performed by an API recreation component 645 as described with reference to FIG. 6.

Figure 9:
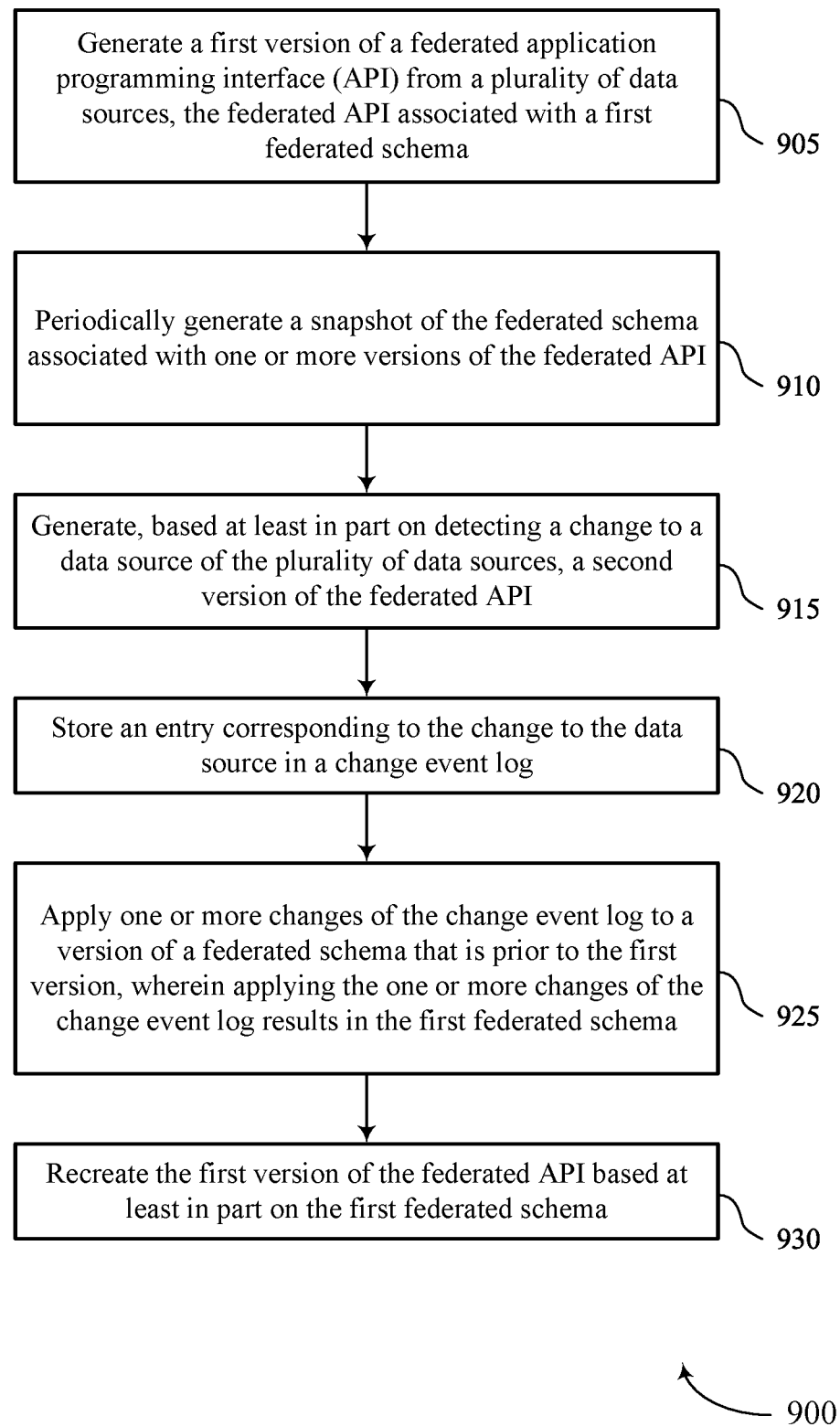

FIG. 9 shows a flowchart illustrating a method 900 that supports regeneration audit log in accordance with aspects of the present disclosure. The operations of the method 900 may be implemented by a server or its components as described herein. For example, the operations of the method 900 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 905, the method may include generating a first version of a federated application programming interface (API) from a set of multiple data sources, the federated API associated with a first federated schema. The operations of 905 may be performed in accordance with examples as disclosed herein. In some examples, aspects of the operations of 905 may be performed by an API generation component 625 as described with reference to FIG. 6.

At 910, the method may include periodically generating a snapshot of the federated schema associated with one or more versions of the federated API. The operations of 910 may be performed in accordance with examples as disclosed herein. In some examples, aspects of the operations of 910 may be performed by a snapshot component 650 as described with reference to FIG. 6.

At 915, the method may include generating, based on detecting a change to a data source of the set of multiple data sources, a second version of the federated API. The operations of 915 may be performed in accordance with examples as disclosed herein. In some examples, aspects of the operations of 915 may be performed by a change detection component 630 as described with reference to FIG. 6.

At 920, the method may include storing an entry corresponding to the change to the data source in a change event log. The operations of 920 may be performed in accordance with examples as disclosed herein. In some examples, aspects of the operations of 920 may be performed by a change log component 635 as described with reference to FIG. 6.

At 925, the method may include applying one or more changes of the change event log to a version of a federated schema that is prior to the first version, where applying the one or more changes of the change event log results in the first federated schema. The changes may be applied to a snapshot of the federated schema. The operations of 925 may be performed in accordance with examples as disclosed herein. In some examples, aspects of the operations of 925 may be performed by a change application component 640 as described with reference to FIG. 6.

At 930, the method may include recreating the first version of the federated API based on the first federated schema. The operations of 930 may be performed in accordance with examples as disclosed herein. In some examples, aspects of the operations of 930 may be performed by an API recreation component 645 as described with reference to FIG. 6.

Figure 10:
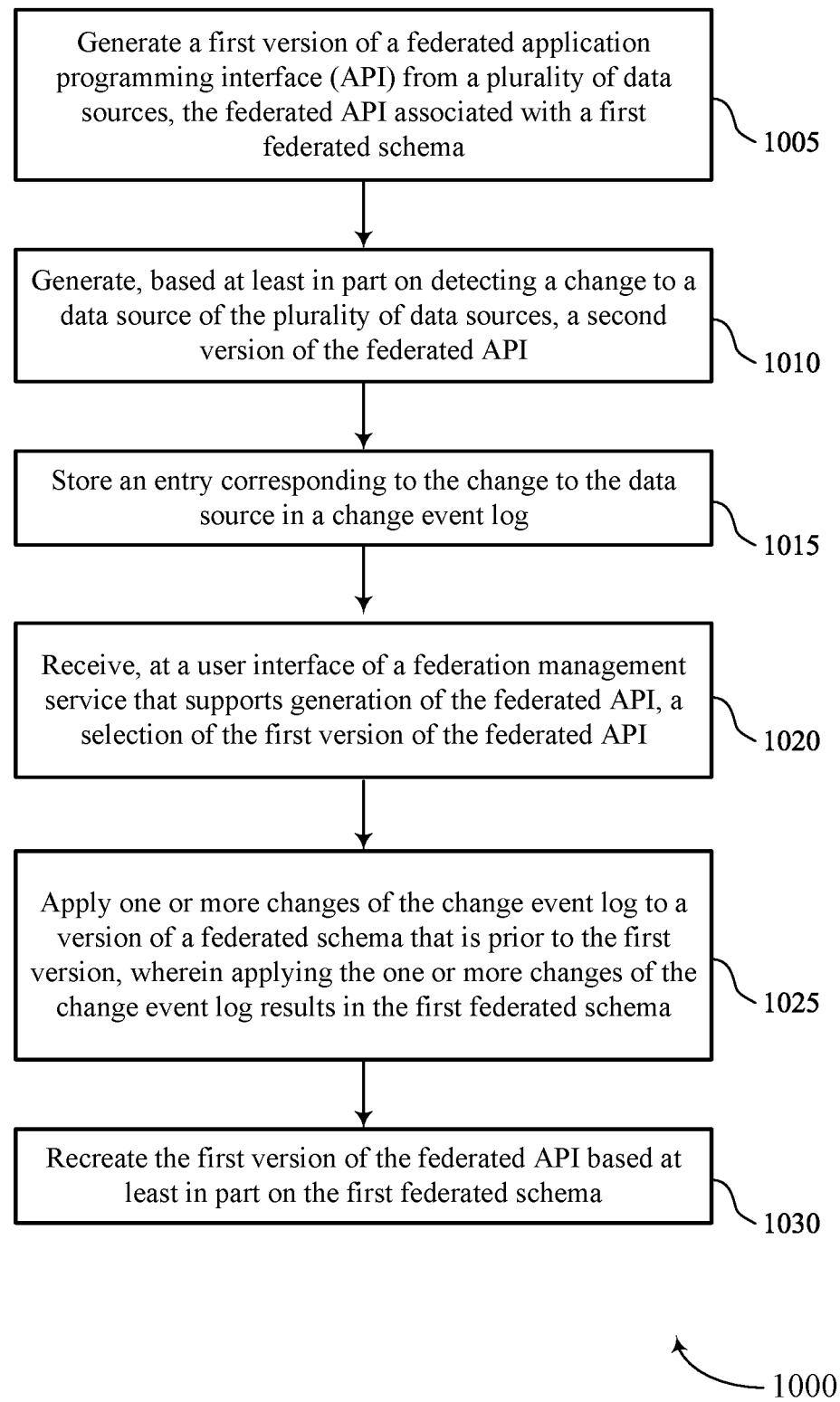

FIG. 10 shows a flowchart illustrating a method 1000 that supports regeneration audit log in accordance with aspects of the present disclosure. The operations of the method 1000 may be implemented by a server or its components as described herein. For example, the operations of the method 1000 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 1005, the method may include generating a first version of a federated application programming interface (API) from a set of multiple data sources, the federated API associated with a first federated schema. The operations of 1005 may be performed in accordance with examples as disclosed herein. In some examples, aspects of the operations of 1005 may be performed by an API generation component 625 as described with reference to FIG. 6.

At 1010, the method may include generating, based on detecting a change to a data source of the set of multiple data sources, a second version of the federated API. The operations of 1010 may be performed in accordance with examples as disclosed herein. In some examples, aspects of the operations of 1010 may be performed by a change detection component 630 as described with reference to FIG. 6.

At 1015, the method may include storing an entry corresponding to the change to the data source in a change event log. The operations of 1015 may be performed in accordance with examples as disclosed herein. In some examples, aspects of the operations of 1015 may be performed by a change log component 635 as described with reference to FIG. 6.

At 1020, the method may include receiving, at a user interface of a federation management service that supports generation of the federated API, a selection of the first version of the federated API. The operations of 1020 may be performed in accordance with examples as disclosed herein. In some examples, aspects of the operations of 1020 may be performed by a UI component 655 as described with reference to FIG. 6.

At 1025, the method may include applying one or more changes of the change event log to a version of a federated schema that is prior to the first version, where applying the one or more changes of the change event log results in the first federated schema. The operations of 1025 may be performed in accordance with examples as disclosed herein. In some examples, aspects of the operations of 1025 may be performed by a change application component 640 as described with reference to FIG. 6.

At 1030, the method may include recreating the first version of the federated API based on the first federated schema. The one or more changes may be applied to the version of the federated schema and the first version of the federated API is recreated based on receiving the selection of the first version at the user interface The operations of 1030 may be performed in accordance with examples as disclosed herein. In some examples, aspects of the operations of 1030 may be performed by an API recreation component 645 as described with reference to FIG. 6.

Figure 11:
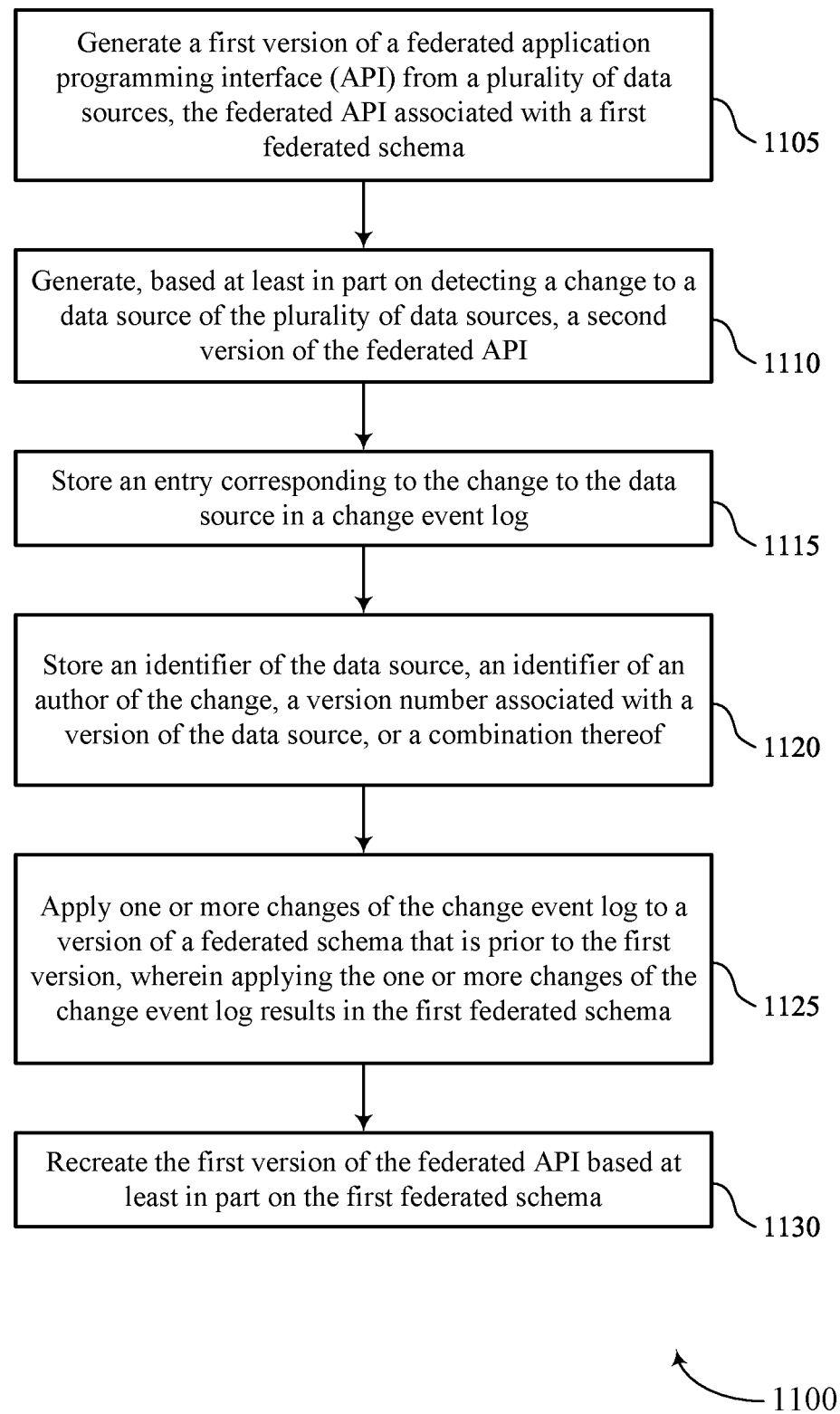

FIG. 11 shows a flowchart illustrating a method 1100 that supports regeneration audit log in accordance with aspects of the present disclosure. The operations of the method 1100 may be implemented by a server or its components as described herein. For example, the operations of the method 1100 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 1105, the method may include generating a first version of a federated application programming interface (API) from a set of multiple data sources, the federated API associated with a first federated schema. The operations of 1105 may be performed in accordance with examples as disclosed herein. In some examples, aspects of the operations of 1105 may be performed by an API generation component 625 as described with reference to FIG. 6.

At 1110, the method may include generating, based on detecting a change to a data source of the set of multiple data sources, a second version of the federated API. The operations of 1110 may be performed in accordance with examples as disclosed herein. In some examples, aspects of the operations of 1110 may be performed by a change detection component 630 as described with reference to FIG. 6.

At 1115, the method may include storing an entry corresponding to the change to the data source in a change event log. The operations of 1115 may be performed in accordance with examples as disclosed herein. In some examples, aspects of the operations of 1115 may be performed by a change log component 635 as described with reference to FIG. 6.

At 1120, the method may include storing an identifier of the data source, an identifier of an author of the change, a version number associated with a version of the data source, or a combination thereof. The operations of 1120 may be performed in accordance with examples as disclosed herein. In some examples, aspects of the operations of 1120 may be performed by a change log component 635 as described with reference to FIG. 6.

At 1125, the method may include applying one or more changes of the change event log to a version of a federated schema that is prior to the first version, where applying the one or more changes of the change event log results in the first federated schema. The operations of 1125 may be performed in accordance with examples as disclosed herein. In some examples, aspects of the operations of 1125 may be performed by a change application component 640 as described with reference to FIG. 6.

At 1130, the method may include recreating the first version of the federated API based on the first federated schema. The operations of 1130 may be performed in accordance with examples as disclosed herein. In some examples, aspects of the operations of 1130 may be performed by an API recreation component 645 as described with reference to FIG. 6.

A method for data processing is described. The method may include generating a first version of a federated application programming interface (API) from a set of multiple data sources, the federated access point (AP)I associated with a first federated schema, generating, based on detecting a change to a data source of the set of multiple data sources, a second version of the federated API, storing an entry corresponding to the change to the data source in a change event log, applying one or more changes of the change event log to a version of a federated schema that is prior to the first version, where applying the one or more changes of the change event log results in the first federated schema, and recreating the first version of the federated API based on the first federated schema.

An apparatus for data processing is described. The apparatus may include a processor, memory coupled with the processor, and instructions stored in the memory. The instructions may be executable by the processor to cause the apparatus to generate a first version of a federated application programming interface (API) from a set of multiple data sources, the federated API associated with a first federated schema, generate, based on detecting a change to a data source of the set of multiple data sources, a second version of the federated API, store an entry corresponding to the change to the data source in a change event log, apply one or more changes of the change event log to a version of a federated schema that is prior to the first version, where applying the one or more changes of the change event log results in the first federated schema, and recreate the first version of the federated API based on the first federated schema.

Another apparatus for data processing is described. The apparatus may include means for generating a first version of a federated application programming interface (API) from a set of multiple data sources, the federated API associated with a first federated schema, means for generating, based on detecting a change to a data source of the set of multiple data sources, a second version of the federated API, means for storing an entry corresponding to the change to the data source in a change event log, means for applying one or more changes of the change event log to a version of a federated schema that is prior to the first version, where applying the one or more changes of the change event log results in the first federated schema, and means for recreating the first version of the federated API based on the first federated schema.

A non-transitory computer-readable medium storing code for data processing is described. The code may include instructions executable by a processor to generate a first version of a federated application programming interface (API) from a set of multiple data sources, the federated API associated with a first federated schema, generate, based on detecting a change to a data source of the set of multiple data sources, a second version of the federated API, store an entry corresponding to the change to the data source in a change event log, apply one or more changes of the change event log to a version of a federated schema that is prior to the first version, where applying the one or more changes of the change event log results in the first federated schema, and recreate the first version of the federated API based on the first federated schema.

In some examples of the method, apparatuses, and non-transitory computer-readable medium described herein, periodically generating a snapshot of the federated schema associated with one or more versions of the federated API, where the first version of the federated API may be recreated based on the snapshot.

In some examples of the method, apparatuses, and non-transitory computer-readable medium described herein, applying the one or more changes may include operations, features, means, or instructions for applying the one or more changes to the snapshot of the federated schema that may be prior to the first version, where applying the one or more changes to the snapshot results in the first federated schema.

Some examples of the method, apparatuses, and non-transitory computer-readable medium described herein may further include operations, features, means, or instructions for receiving, at a user interface of a federation management service that supports generation of the federated API, a selection of the first version of the federated API, where the one or more changes may be applied to the version of the federated schema and the first version of the federated API may be recreated based on receiving the selection of the first version at the user interface.

In some examples of the method, apparatuses, and non-transitory computer-readable medium described herein, storing the entry corresponding to the change may include operations, features, means, or instructions for storing an identifier of the data source, an identifier of an author of the change, a version number associated with a version of the data source, or a combination thereof.

In some examples of the method, apparatuses, and non-transitory computer-readable medium described herein, the change includes a modification to an element of the data source, a change to a version of the data source, or both.

Some examples of the method, apparatuses, and non-transitory computer-readable medium described herein may further include operations, features, means, or instructions for detecting that the first version of the federated API may be deployed to a host environment and storing to the change event log, an indication that the first version of the federated API may be deployed to the host environment.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

generating a first version of a federated application programming interface (API) from a plurality of different data sources, the federated API being associated with a first federated schema version, wherein the federated API includes a first element that is configured to access data from an API of a service included in the plurality of different data sources and a second element configured to access data from a database included in the plurality of different data sources, and wherein the first federated schema version links both the first element and the second element to the federated API;

detecting a change to a data source of the plurality of different data sources based at least in part on an implementation of the change to the data source;

generating, in response to detecting the change to the data source of the plurality of different data sources, a second version of the federated API that is associated with a second federated schema version;

storing an entry corresponding to the change to the data source in a change event log;

loading a third version of the federated API associated with a third federated schema version that is prior to both the first federated schema version and the second federated schema version;

applying one or more changes of the change event log to the third federated schema version based at least in part on loading the third version of the federated schema, the one or more changes being associated with changes to the plurality of different data sources between the third federated schema version and the first federated schema version, wherein applying the one or more changes of the change event log to the third federated schema version results in obtaining the first federated schema version; and recreating, in response to applying the one or more changes to the third federated schema version, the first version of the federated API based at least in part on obtaining the first federated schema version as a result of applying the one or more changes to the third federated schema version, wherein the first version of the federated API is recreated subsequent to generating the second version of the federated API.

2. The method of claim 1, further comprising:

periodically generating a snapshot of a respective federated schema version associated with one or more versions of the federated API, wherein the first version of the federated API is recreated based at least in part on the snapshot.

3. The method of claim 2, wherein applying the one or more changes comprises:
applying the one or more changes to the snapshot of the respective federated schema version that is prior to the first federated schema version, wherein applying the one or more changes to the snapshot results in the first federated schema version.

4. The method of claim 1, further comprising:
receiving, at a user interface of a federation management service that supports generation of the federated API, a selection of the first version of the federated API, wherein the one or more changes are applied to a respective federated schema version and the first version of the federated API is recreated based at least in part on receiving the selection of the first version at the user interface.

5. The method of claim 1, wherein storing the entry corresponding to the change comprises:
storing an identifier of the data source, an identifier of an author of the change, a version number associated with a version of the data source, or a combination thereof.

6. The method of claim 1, wherein the change comprises a modification to an element of the data source, a change to a version of the data source, or both.

7. The method of claim 1, further comprising:
detecting that the first version of the federated API is deployed to a host environment; and
storing to the change event log, an indication that the first version of the federated API is deployed to the host environment.

8. The method of claim 1, wherein each data source of the plurality of different data sources is a respective API or a respective database.

9. An apparatus for data processing, comprising:
one or more processors;
one or more memories coupled with the one or more processors; and
instructions stored in the one or more memories and executable by the one or more processors to cause the apparatus to:
generate a first version of a federated application programming interface (API) from a plurality of different data sources, the federated API being associated with a first federated schema version, wherein the federated API includes a first element that is configured to access data from an API of a service included in the plurality of different data sources and a second element configured to access data from a database included in the plurality of different data sources, and wherein the first federated schema version links both the first element and the second element to the federated API;
detecting a change to a data source of the plurality of different data sources based at least in part on an implementation of the change to the data source;
generate, in response to detecting the change to the data source of the plurality of different data sources, a second version of the federated API that is associated with a second federated schema version;
store an entry corresponding to the change to the data source in a change event log;

loading a third version of the federated API associated with a third federated schema version that is prior to both the first federated schema version and the second federated schema version;
apply one or more changes of the change event log to the third federated schema version based at least in part on loading the third federated schema version, the one or more changes being associated with changes to the plurality of different data sources between the third federated schema version and the first federated schema version, wherein applying the one or more changes of the change event log to the third federated schema version results in obtaining the first federated schema version; and
recreate, in response to applying the one or more changes to the third federated schema version, the first version of the federated API based at least in part on obtaining the first federated schema version as a result of applying the one or more changes to the third federated schema version, wherein the first version of the federated API is recreated subsequent to generating the second version of the federated API.

10. The apparatus of claim 9, wherein the instructions are further executable by the one or more processors to cause the apparatus to:
periodically generate a snapshot of a respective federated schema version associated with one or more versions of the federated API, wherein the first version of the federated API is recreated based at least in part on the snapshot.

11. The apparatus of claim 10, wherein the instructions to apply the one or more changes are executable by the one or more processors to cause the apparatus to:
apply the one or more changes to the snapshot of the respective federated schema version that is prior to the first federated schema version, wherein applying the one or more changes to the snapshot results in the first federated schema version.

12. The apparatus of claim 9, wherein the instructions are further executable by the one or more processors to cause the apparatus to:
receive, at a user interface of a federation management service that supports generation of the federated API, a selection of the first version of the federated API, wherein the one or more changes are applied to a respective federated schema version and the first version of the federated API is recreated based at least in part on receiving the selection of the first version at the user interface.

13. The apparatus of claim 9, wherein the instructions to store the entry corresponding to the change are executable by the one or more processors to cause the apparatus to:
store an identifier of the data source, an identifier of an author of the change, a version number associated with a version of the data source, or a combination thereof.

14. The apparatus of claim 9, wherein the change comprises a modification to an element of the data source, a change to a version of the data source, or both.

15. The apparatus of claim 9, wherein the instructions are further executable by the one or more processors to cause the apparatus to:
detect that the first version of the federated API is deployed to a host environment; and
store to the change event log, an indication that the first version of the federated API is deployed to the host environment.

16. A non-transitory computer-readable medium storing code for data processing, the code comprising instructions executable by one or more processors to:

generating a first version of a federated application programming interface (API) from a plurality of different data sources, the federated API being associated with a first federated schema version, wherein the federated API includes a first element that is configured to access data from an API of a service included in the plurality of different data sources and a second element configured to access data from a database included in the plurality of different data sources, and wherein the first federated schema version links both the first element and the second element to the federated API;

detecting a change to a data source of the plurality of different data sources based at least in part on an implementation of the change to the data source;

generating, in response to detecting the change to the data source of the plurality of different data sources, a second version of the federated API that is associated with a second federated schema version;

storing an entry corresponding to the change to the data source in a change event log;

loading a third version of the federated API associated with a third federated schema version that is prior to both the first federated schema version and the second federated schema version;

applying one or more changes of the change event log to the third federated schema version based at least in part on loading the third federated schema version, the one or more changes being associated with changes to the plurality of different data sources between the third federated schema version and the first federated schema version, wherein applying the one or more changes of the change event log to the third federated schema version results in obtaining the first federated schema version; and recreating, in response to applying the one or more changes to the third federated schema version, the first version of the federated API based at least in part on obtaining the first federated schema version as a result of applying the one or more changes to the third federated schema version, wherein the first version of the federated API is recreated subsequent to generating the second version of the federated API.

17. The non-transitory computer-readable medium of claim 16, wherein the instructions are further executable by the one or more processors to:

periodically generate a snapshot of a respective federated schema version associated with one or more versions of the federated API, wherein the first version of the federated API is recreated based at least in part on the snapshot.

18. The non-transitory computer-readable medium of claim 17, wherein the instructions to apply the one or more changes are executable by the one or more processors to:

apply the one or more changes to the snapshot of the respective federated schema version that is prior to the first federated schema version, wherein applying the one or more changes to the snapshot results in the first federated schema version.

19. The non-transitory computer-readable medium of claim 16, wherein the instructions are further executable by the one or more processors to:

receive, at a user interface of a federation management service that supports generation of the federated API, a selection of the first version of the federated API, wherein the one or more changes are applied to a respective federated schema version and the first version of the federated API is recreated based at least in part on receiving the selection of the first version at the user interface.

20. The non-transitory computer-readable medium of claim 16, wherein the instructions to store the entry corresponding to the change are executable by the one or more processors to:

store an identifier of the data source, an identifier of an author of the change, a version number associated with a version of the data source, or a combination thereof.

* * * * *